(12) United States Patent
Davidson

(10) Patent No.: US 7,501,385 B2
(45) Date of Patent: Mar. 10, 2009

(54) COMPOSITIONS AND METHODS FOR WATER CONTROL AND STRENGTHENING UNCONSOLIDATED FORMATIONS

(75) Inventor: Eric A. Davidson, Cults (GB)

(73) Assignee: Halliburton Energy Services, Inc., Duncan, OK (US)

( * ) Notice: Subject to any disclaimer, the term of this patent is extended or adjusted under 35 U.S.C. 154(b) by 503 days.

(21) Appl. No.: 10/868,562

(22) Filed: Jun. 15, 2004

(65) Prior Publication Data
US 2005/0284667 A1 Dec. 29, 2005

(51) Int. Cl.
*C09K 8/32* (2006.01)
(52) U.S. Cl. ...................... 507/140; 507/145
(58) Field of Classification Search .......... None
See application file for complete search history.

(56) References Cited

U.S. PATENT DOCUMENTS

| | | | | |
|---|---|---|---|---|
| 2,169,458 A | * | 8/1939 | Bent et al. ............... | 166/294 |
| 2,265,962 A | * | 12/1941 | Bent et al. ............... | 166/281 |
| 2,764,546 A | * | 9/1956 | Engle ...................... | 507/138 |
| 3,614,985 A | | 10/1971 | Richardson ............... | 166/294 |
| 3,756,315 A | | 9/1973 | Suman, Jr. et al. ......... | 166/276 |
| 3,827,495 A | | 8/1974 | Reed ...................... | 166/250 |
| 3,837,400 A | | 9/1974 | Martin .................... | 166/274 |
| 3,915,727 A | * | 10/1975 | Sparlin et al. ............. | 106/223 |
| 4,031,958 A | | 6/1977 | Sandiford et al. ........... | 166/270 |
| 4,045,357 A | | 8/1977 | Reed ...................... | 507/123 |
| 4,191,249 A | * | 3/1980 | Sarem ..................... | 166/305.1 |
| 4,235,727 A | | 11/1980 | Firth, Jr. .................. | 252/8.5 C |
| 4,304,301 A | | 12/1981 | Sydansk ................... | 166/292 |
| 4,311,600 A | | 1/1982 | Firth, Jr. .................. | 252/8.5 C |
| 4,380,408 A | | 4/1983 | Loken et al. ............... | 405/263 |
| 4,413,680 A | | 11/1983 | Sandiford et al. ........... | 166/270 |
| 4,425,167 A | | 1/1984 | Bryhn ..................... | 106/287.7 |
| 4,498,539 A | | 2/1985 | Bruning | |
| 4,797,461 A | | 1/1989 | Aubanel et al. ............. | 526/348.6 |
| 4,889,645 A | | 12/1989 | Firth, Jr. .................. | 252/8.514 |
| 4,921,620 A | | 5/1990 | Firth, Jr. .................. | 252/8.513 |
| 5,150,754 A | * | 9/1992 | Phelps et al. .............. | 166/294 |
| 5,191,100 A | | 3/1993 | Firth, Jr. .................. | 556/27 |
| 6,110,880 A | | 8/2000 | Verstrate et al. ............ | 508/591 |
| 6,500,785 B1 | | 12/2002 | Carminati et al. ........... | 507/103 |
| 2003/0045605 A1 | | 3/2003 | Thompson ................. | 523/130 |

FOREIGN PATENT DOCUMENTS

| | | |
|---|---|---|
| EP | 0 266 808 A1 | 5/1988 |
| JP | 353109883 A | 9/1978 |
| JP | 362267387 A | 11/1987 |

OTHER PUBLICATIONS

Foreign communication from a related counterpart application dated Sep. 30, 2005.

* cited by examiner

*Primary Examiner*—Marc S Zimmer
(74) *Attorney, Agent, or Firm*—Craig W. Roddy; Baker Botts, L.L.P.

(57) ABSTRACT

The present invention relates, in general, to subterranean fluids, and more particularly, to subterranean drilling fluids that may be useful for reducing the production of water from a portion of a subterranean formation and/or stabilizing an unconsolidated portion of a subterranean formation while drilling. In some embodiments, the present invention provides methods of reducing the flow of water from a portion of a subterranean formation that comprise contacting the portion of the subterranean formation with an organoaluminum compound, the organoaluminum compound being capable of forming a reaction product in the presence of water. The present invention also includes methods of drilling a well bore in a subterranean formation, methods of enhancing the stability of an unconsolidated portion of a subterranean formation, methods of stabilizing an unconsolidated portion of a subterranean formation, and drilling fluids.

17 Claims, No Drawings

COMPOSITIONS AND METHODS FOR WATER CONTROL AND STRENGTHENING UNCONSOLIDATED FORMATIONS

BACKGROUND

The present invention relates, in general, to subterranean fluids, and more particularly, to subterranean drilling fluids that may be useful for reducing the production of water from a portion of a subterranean formation and/or stabilizing an unconsolidated portion of a subterranean formation while drilling.

The production of water with hydrocarbons from subterranean wells generally is problematic and expensive. While hydrocarbon-producing wells are usually completed in hydrocarbon-bearing formations, such formations may contain, or may be adjacent to, water-bearing sections. Generally, the term "water-bearing section" refers to any portion of a subterranean formation that may produce water, including a hydrocarbon-bearing section that has sufficiently high water content such that water may be produced along with hydrocarbons. Water is highly mobile and easily may flow into the well bore by way of natural fractures and/or high permeability streaks that may be present in the formation. Over the life of such wells, the ratio of water to hydrocarbons recovered may be undesirable in view of the cost of producing the water, separating it from the hydrocarbons, and disposing of it, which can represent a significant economic loss.

The production of water with desirable fluids may be addressed with conventional methods. For example, a treatment fluid including a resin may be injected downhole to reduce the production of water with desirable fluids. This method may include identifying a watered out section, cleaning the filter cake with an acid, and injecting a treatment fluid including a resin into the watered out zone so as to reduce the production of water. This conventional approach generally is undesirable because it increases the cost, time, and labor associated with the well. Additionally, if the water-bearing section is not identified accurately or sealed sufficiently, production of the desired fluid, as opposed to the undesired water, may be reduced, which is undesirable.

Another potential problem in the production of hydrocarbons involves unconsolidated portions of the subterranean formation, for example, unconsolidated sections of sand that may include water. Unconsolidated portions of a subterranean formation include those that contain loose grains of sand and those wherein the bonded grains of sand have insufficient bond strength to withstand forces generated by subterranean operations. Although unconsolidated sections of sand generally may be relatively easy to drill through while a positive differential pressure exists on the sand face, subsequent drilling operations may be problematic. For example, removal of the drill string from the bore hole may reduce the pressure across the boundary between an unconsolidated section of sand and the well bore such that the bore hole may collapse within the section of unconsolidated sand. Consequently, sections of unconsolidated sand that include a large amount of, or are saturated with, water can present prolonged difficulties during drilling and casing operations that may lead to the loss of a section of a hole.

SUMMARY

The present invention relates, in general, to subterranean fluids, and more particularly, to subterranean drilling fluids that may be useful for reducing the production of water from a portion of a subterranean formation and/or stabilizing an unconsolidated portion of a subterranean formation while drilling.

In some embodiments, the present invention provides a method of reducing the flow of water from a portion of a subterranean formation. The method comprises contacting the portion of the subterranean formation with an organoaluminum compound, the organoaluminum compound being capable of forming a reaction product in the presence of water.

In another embodiment, the present invention provides a method of enhancing the stability of an unconsolidated portion of a subterranean formation that comprises water. The method comprises contacting the unconsolidated portion of the subterranean formation with an organoaluminum compound, the organoaluminum compound being capable of reacting with the water in the unconsolidated portion to at least partially enhance the stability of the unconsolidated portion of the subterranean formation.

In another embodiment, the present invention provides a method of drilling a well bore in a subterranean formation. The method comprises providing a drilling fluid that comprises an oil-based fluid and an organoaluminum compound, and drilling the well bore using the drilling fluid.

In another embodiment, the present invention provides a method of drilling a well bore in a subterranean formation. The method comprises providing a first drilling fluid that comprises an oil-based fluid and a first organoaluminum compound, the first organoaluminum compound being capable reacting with water to stabilize an unconsolidated section of sand, wherein the unconsolidated section of sand includes the water. The method further comprises drilling the well bore using the first drilling fluid. The method further comprises providing a second drilling fluid that comprises an oil-based fluid and a second organoaluminum compound, the second organoaluminum compound being capable of reacting with water present in a water bearing section of the subterranean formation to reduce the flow of water therefrom. And the method further comprises drilling the well bore using the second drilling fluid.

In another embodiment, the present invention provides a method of reducing the flow of water from a portion of a subterranean formation. The method comprises allowing an organoaluminum compound to react with water present in the portion of the subterranean formation to form at least one reaction product that at least partially blocks pore spaces in the portion of the subterranean formation.

In another embodiment, the present invention provides a method of stabilizing an unconsolidated portion of a subterranean formation that comprises water. The method comprises allowing an organoaluminum compound to react with the water to form at least one reaction product that acts to at least partially stabilize the unconsolidated portion of the subterranean formation.

In another embodiment, the present invention provides a drilling fluid. The drilling fluid comprises an oil-based fluid and an organoaluminum compound, wherein the organoaluminum compound is capable of reacting with water to form at least one reaction product.

The features and advantages of the present invention will be readily apparent to those skilled in the art upon a reading of the detailed description that follows.

DETAILED DESCRIPTION

The present invention relates, in general, to subterranean fluids, and more particularly, to subterranean drilling fluids that may be useful for reducing the production of water from a portion of a subterranean formation and/or stabilizing an unconsolidated portion of a subterranean formation while drilling.

The drilling fluids of the present invention generally comprise a base fluid and an organoaluminum compound that is capable of reacting with water to form at least one reaction product. In certain embodiments, at least a portion of the organoaluminum compounds in a drilling fluid may leak off into the formation. If the subterranean formation includes water, the organoaluminum compounds react with the water so as to form at least one reaction product that blocks and/or reduces the volume of the pore spaces in the formation. Where a portion of the formation comprises enough water to cause a large volume of the organoaluminum compounds to react, the volume of the at least one reaction product may be so high as to substantially block the production of water from that portion of the formation. Other embodiments of the present invention provide drilling fluids that may be used in operations to stabilize unconsolidated portions of a subterranean formation while drilling, for example, to stabilize a section of unconsolidated sand that may include undesirable water. In such embodiments, the selected organoaluminum compound is capable of stabilizing an unconsolidated section of sand in a subterranean formation during drilling, e.g., by the at least one reaction product binding together some of the grains of sand in the section.

Generally, the base fluid utilized in formulating the drilling fluids of the present invention may comprise any oil-based fluid suitable for use in drilling operations. Examples of suitable oil-based fluids include, but are not limited to, mineral oils, synthetic oils, esters, or any other oil suitable for use in drilling operations. In one exemplary embodiment, the base fluid comprises a refined hydrocarbon, such as diesel oil or low toxicity mineral oil. Certain oil-based emulsions, such as an invert emulsion, may not be desirable because there may be undesirable interactions between the organoaluminum compounds and an aqueous phase in the emulsion. Thus, the drilling fluids of the present invention preferably should comprise a minimal amount of water that will not negatively impact the organoaluminum compounds of the present invention.

Another component of the drilling fluid includes an organoaluminum compound. Suitable organoaluminum compounds include organoaluminum compounds that react with water to form at least one reaction product, which, inter alia, may act to block and/or reduce the pore volume of the subterranean formation, and thereby reduce the flow of water from the subterranean formation to the bore hole or well bore. Organoaluminum compounds suitable for use in the present invention include long chain fatty acids, aluminum alcoholates, aluminum alcoxides, and aluminum butoxides. In some embodiments, the aluminum alcoholate comprises aluminum butoxides. Suitable examples include aluminum-bis-(2-butoxide)-ethylacetoacetate, and aluminum-(2-butoxide)-bis-(ethylacetoacetate). Other suitable organoaluminum compounds include aluminum tri-isopropoxide, aluminum sec-butoxide di-isopropoxide, aluminum tri-isopropoxide octanol, aluminum ethylacetoacetate di-isopropoxide, aluminum ethylacetoacetate di-octoxide, polyoxo aluminum octoate, aluminum carboxylate, and aluminum oleate. Some suitable long chain fatty acid organoaluminum compounds include stearates. One suitable stearic acid is a carboxylic acid, wherein the hydrogen group is replaced by an aluminum group. One such suitable carboxylic acid is aluminum oxystearate, which is relatively stable in an oil-rich environment. Other suitable organoaluminum compounds will be evident to one skilled in the art with the benefit of this disclosure. Mixtures or combinations of different organoaluminum compounds also may be used in the compositions and methods of the present invention.

The organoaluminum compounds of the present invention should react with water to form at least one reaction product. Example reaction products include precipitates and complexes (e.g., basic aluminum compounds and aluminum soaps) and combinations thereof, wherein the precipitates and complexes comprise aluminum hydroxide. In some embodiments, the at least one reaction product includes aluminum hydroxide. For example, in one certain embodiment, an aluminum alcoholate may react with water to form at least one reaction product that includes aluminum hydroxide.

In selecting a suitable organoaluminum compound, one should be mindful of the flash point of the selected organoaluminum compound. In particular, the hydrolysis of some organoaluminum compounds with water may produce, among other things, an alcohol moiety that may release a volatile alcohol having a low flash point, which may become a hazard in some circumstances. For instance, aluminum tri-sec-butoxide has a flash point of about 26° C. Other organoaluminum compounds have higher flash points. For example, the hydrolysis of aluminum-bis-(2-butoxide)-ethylacetoacetate and aluminum-(2-butoxide)-bis-(ethylacetoacetate) in mineral oil has a flash point of about 65° C. Flash points of some exemplary organoaluminum compounds are given in Table 1.

TABLE 1

| Flash Points of Some Organoaluminum Compounds | |
|---|---|
| ORGANOALUMINUM COMPOUND | FLASH POINT |
| Aluminum tri-isopropoxide | 17° C. |
| Aluminum sec-butoxide di-isopropoxide | 18° C. |
| Aluminum tri-isopropoxide octanol complex in white spirit | 14° C. |
| Aluminum ethylacetoacetate di-isopropoxide | 35° C. |
| Aluminum ethylacetoacetate di-octoxide | 70° C. |
| Aluminum carboxylate in high boiling solvent | 68° C. |

The concentration of the organoaluminum compound that should be included in the drilling fluids of the present invention should be sufficient to provide the desired functionality, for example, to reduce the production of water and/or stabilize unconsolidated sections of sand. Generally, where desired to block and or reduce the volume of pore spaces in a subterranean formation to reduce the production of water, the concentration of the organoaluminum compound in the drilling fluid will vary based on a number of factors, including the porosity of the rock formation and the dimension of the pores. For example, a formation with very small pores (e.g., less than about 5 microns in diameter) will require less reaction products for effective blockage than a formation with larger pores (e.g., up to about 50 microns in diameter). Irrespective of how the fluids of the present invention are used in a drilling operation, the drilling fluid, generally, should comprise a sufficient amount of the organoaluminum compound to have an aluminum concentration in the range of from about 0.005% to about 10% weight of aluminum by volume of the drilling fluid ("w/v"). In other embodiments, the drilling fluid should comprise a sufficient amount of the organoaluminum compound to have an aluminum concentration the range of from about 0.05% to about 5% (w/v). In other embodiments, the drilling fluid should comprise a sufficient amount of the organoaluminum compound to have an aluminum concentration in the range of from about 0.1% to about 1% (w/v). In another embodiment, the drilling fluid should comprise a sufficient amount of the organoaluminum compound to have an aluminum concentration of about 0.5% (w/v).

Additional additives may be added to the drilling fluids of the present invention as deemed appropriate by one skilled in the art so long as those additives are not incompatible with the chosen organoaluminum compound. Examples of such additives include, but are not limited to, viscosifying agents (e.g., organophilic clay minerals), fluid loss agents (e.g., derivatives of asphalt or lignitic minerals), polar activators (e.g., polyhydroxy compounds), desiccating or secondary emulsifying agents (e.g., a tall oil), supplementary viscosifying or fluid loss agents required by the conditions of the drilling operation (e.g., block copolymers of styrene and ethylene/propylene), breakers, lost circulation materials (e.g., organic fibers and sized graphite), supplementary rheology additives based on fatty acid complexes, and combinations thereof. The polar activator may be added to potentiate the activity of the viscosifying agent such as organophilic clay. The desiccating or secondary emulsifying agent may be added to remove or immobilize water that is picked up during the drilling operations.

The drilling fluids of the present invention may be formulated as low-solids content drilling fluids or high-solids content drilling fluids, depending on the desired density of the drilling fluid. One embodiment of a low-solids content drilling fluid of the present invention comprises about 0.92 $m^3$ of an oil such as a highly refined linear alkane, about 8.6 $kg/m^3$ of a passive emulsifier such as a refined tall oil fatty acid, about 51 $kg/m^3$ of an organophilic clay such as bentonitic clay that has been treated with an amine, about 5.7 $kg/m^3$ of lime (CaO), about 57 $kg/m^3$ of an organophilic lignite or asphalt lignite such as a lignite that has been treated with an amine or powdered asphalt, about 100 litres/$m^3$ of a fluid comprising about 62.8% (w/v) aluminum oxystearate and refined linear alkane oil, and about 30 $kg/m^3$ of a polar activator such as a polyhydroxy compound. In this embodiment, the low-solids content drilling fluid has an aluminum concentration of about 0.5 $kg/m^3$.

An embodiment of a high-solids content drilling fluid of the present invention comprises about 0.75 $m^3$ of an oil such as a highly refined linear alkane, about 8.6 $kg/m^3$ of a passive emulsifier such as a refined tall oil fatty acid, about 34 $kg/m^3$ of an organophilic clay such as a bentonitic clay that has been treated with an amine, about 40 $kg/m^3$ of an organophilic lignite or asphalt lignite such as a lignite that has been treated with an amine or powdered asphalt, about 5.7 $kg/m^3$ of lime, about 100 litres/$m^3$ of a solution comprising about 62.8% (w/v) aluminum oxystearate in refined linear alkane oil, about 86 $kg/m^3$ of 5 µm carbonate, about 426 $kg/m^3$ of 50 µm carbonate, and about 30 $kg/m^3$ of a polar activator such as a polyhydroxy compound. In this embodiment, the high-solids content drilling fluid includes about 6.3 $kg/m^3$ of aluminum oxystearate or an aluminum concentration of about 0.5 $kg/m^3$.

In one embodiment, the present invention provides a method of drilling a portion of a well bore comprising the steps of providing a drilling fluid that comprises an organoaluminum compound and drilling the well bore. Drilling the well bore may be accomplished by using drilling equipment, such as a drill string and a drill bit, along with the drilling fluid. Drilling operations may include any suitable technique for forming a well bore that penetrates a subterranean formation. Examples of suitable techniques for forming a well bore may include, but are not limited to, rotary drilling and cable-tool drilling. Other techniques for forming a well bore may be used, but generally to a lesser extent. Rotary drilling operations typically involve attaching a drill bit on a lower end of a drill string to form a drilling tool and rotating the drill bit along with the drill string into a subterranean formation to create a well bore through which subsurface formation fluids may be produced. As the drill bit penetrates the subterranean formation, additional joints of pipe may be coupled to the drill string. In another method of drilling, coiled tubing may be used instead of jointed pipe and the drill bit may be rotated using a downhole motor.

Drilling fluids of the present invention also may provide a method of strengthening an unconsolidated portion of a subterranean formation during drilling. For example, a drilling fluid that comprises an organoaluminum compound may be used during drilling to strengthen an unconsolidated section of sand that includes water. In one embodiment, the organoaluminum compound in the drilling fluid may react with water in the unconsolidated portion to form at least one reaction product that at least partially stabilizes the unconsolidated portion. For example, the reaction of the organoaluminum compound in the treatment fluid with water in an unconsolidated section of sand may bind together a portion of the unconsolidated section of sand, e.g., by binding together the grains of sand in the unconsolidated section. Following the reaction of an organoaluminum compound with water, the binding strength of the near-well bore region may be enhanced sufficiently so as to reduce the possibility of a well bore collapse near the unconsolidated portion of the subterranean formation, during, for example, casing.

It should be readily apparent to one skilled in the art with the benefit of this disclosure that the organoaluminum compounds of the present invention may be used in applications other than drilling. The methods and drilling fluids of the present invention may be useful in additional subterranean applications, for example, where it is desirable to reduce or prevent the inflow of water and/or stabilize unconsolidated portions of a formation. In one embodiment, the organoaluminum compound may be delivered down hole via a wireline tool. The wireline tool may include a reservoir or storage tank capable of transferring an organoaluminum compound into the well bore. In another embodiment, the drill string may be removed from the bore hole, and the aluminum compound may be injected directly downhole into the vicinity of the water-bearing section or unconsolidated portion of a subterranean formation. For example, the compounds and fluids of the present invention may be injected into the annulus flow of the drill string. In another embodiment, resins may be included with organoaluminum compounds to seal water-bearing sections or reduce the flow of water from water-bearing sections.

In still another embodiment, the compositions and fluids of the present invention may include servicing or completion fluids. A servicing or completion fluid may be used, for example, during an operation to stabilize an unconsolidated section of sand following penetration of that section by the drill bit. In one embodiment, the compositions and fluids of the present invention may be delivered into, or substituted for, the annulus fluid of the drilling system. Alternatively, the drill string may be removed and the fluids and compositions of the present invention may be injected downhole into well bore.

In some embodiments, the present invention provides a method of reducing the flow of water from a portion of a subterranean formation. The method comprises contacting the portion of the subterranean formation with an organoaluminum compound, the organoaluminum compound being capable of forming a reaction product in the presence of water. In some embodiments, the method may further comprise allowing the organoaluminum compound to react with the water present in the subterranean formation so as to form the at least one reaction product.

In another embodiment, the present invention provides a method of enhancing the stability of an unconsolidated portion of a subterranean formation that comprises water. The method comprises contacting the unconsolidated portion of the subterranean formation with an organoaluminum compound, the organoaluminum compound being capable of reacting with the water in the unconsolidated portion to at least partially enhance the stability of the unconsolidated portion of the subterranean formation. In some embodiments, the method may further comprise allowing the organoaluminum compound to react with the water in the unconsolidated portion of the subterranean formation to at least partially enhance the stability of the unconsolidated portion of the subterranean formation.

In another embodiment, the present invention provides a method of drilling a well bore in a subterranean formation. The method comprises providing a drilling fluid that comprises an oil-based fluid and an organoaluminum compound, and drilling the well bore using the drilling fluid.

In another embodiment, the present invention provides a method of drilling a well bore in a subterranean formation. The method comprises providing a first drilling fluid that comprises an oil-based fluid and a first organoaluminum compound, the first organoaluminum compound being capable reacting with water to stabilize an unconsolidated section of sand, wherein the unconsolidated section of sand includes the water. The method further comprises drilling the well bore using the first drilling fluid. The method further comprises providing a second drilling fluid that comprises an oil-based fluid and a second organoaluminum compound, the second organoaluminum compound being capable of reacting with water present in a water bearing section of the subterranean formation to reduce the flow of water therefrom. And the method further comprises drilling the well bore using the second drilling fluid.

In another embodiment, the present invention provides a method of reducing the flow of water from a portion of a subterranean formation. The method comprises allowing an organoaluminum compound to react with water present in the portion of the subterranean formation to form at least one reaction product that at least partially blocks pore spaces in the portion of the subterranean formation.

In another embodiment, the present invention provides a method of stabilizing an unconsolidated portion of a subterranean formation that comprises water. The method comprises allowing an organoaluminum compound to react with the water to form at least one reaction product that acts to at least partially stabilize the unconsolidated portion of the subterranean formation.

In another embodiment, the present invention provides a drilling fluid. The drilling fluid comprises an oil-based fluid and an organoaluminum compound, wherein the organoaluminum compound is capable of reacting with water to form at least one reaction product.

To facilitate a better understanding of the present invention, the following examples of certain embodiments are given. In no way should the following examples be read to limit, or to define, the scope of the invention.

EXAMPLES

Example 1

A steel cell was packed with Ballotini glass spheres having diameters between 4 and 45 microns to simulate a fairly permeable formation having a permeability of about 800 mD. The steel cell was connected into a flow loop that allowed a fluid to be flowed through the steel cell and for the flow rate and differential pressures across the cell to be measured. An aluminum oxystearate fluid was initially prepared as a fluid of a low toxicity oil such as "CLAIRSOL 370" (available from Petrochem Carless Ltd., Surrey England) having a final concentration of about 5% (w/w) aluminum. A 10% aluminum stearate solution (v/v, 0.5% concentration of aluminum) was prepared by diluting the aluminum stearate solution with CLAIRSOL 370 oil.

Water was flowed through the steel cell containing the glass spheres at a constant rate of 72 ml/min at 0.6 bar. The "production direction" was defined to be the direction of the water flow. Next, 15 ml of the 10% aluminum oxystearate solution (0.5% final concentration of aluminum) was injected into the cell in a direction opposite the production direction. Subsequently, 15 ml of the CLAIRSOL 370 oil was injected into the cell in a direction opposite the production direction. The cell was then sealed and static aged at about 60° C. for about 56 hours. The aging step was performed to simulate the condition that the field injected filtrate would remain in place for several hours—if not days—before production of fluid would be attempted.

After the aging process, water was flowed in the production direction at a constant differential pressure for five minutes and the flow rate was measured. The differential pressure was increased (or decreased) according to the first column of Table 2 and a flow rate was obtained for each differential pressure measurement. Table 2 summarizes the results of this example.

TABLE 2

Flow rate as a function of differential pressure.

| DIFFERENTIAL PRESSURE (bar) | FLOW RATE (ml/min) |
|---|---|
| 0 | 0 |
| 0.1 | 0 |
| 0.2 | 0 |
| 0.3 | 0 |
| 0.4 | 3.3 |
| 0.5 | 4.8 |
| 0.6 | 7.6 |
| 1.0 | 16.5 |
| 1.0 | 20 |
| 1.0 | 21 |
| 0.6 | 10.6 |

As shown in Table 2, aluminum oxystearates appear to reduce the flow rate of water through the test cell. The flow rate of the water at a differential pressure of 0.6 bar was between 7.6 and 10.6 ml/min, which is about 10-15% of the flow rate before the test, or a reduction in flow rate of about 85-90%. Moreover, it is possible that the reduction in flow rate by the aluminum oxystearates may be enhanced in a medium of lower permeability because the pores surrounding the smaller particles should be easier to block. Moreover, some of the glass balls had consolidated after the test.

Example 2

Additional tests were performed to determine the effect of introducing CLAIRSOL 370 oil, by itself, into a steel cell. A steel cell was packed with Ballotini glass spheres having diameters between 4 and 45 microns to simulate a fairly permeable formation having a permeability of about 800 mD. The steel cell was connected into a flow loop that allowed a fluid to be flowed through the steel cell and for the flow rate and differential pressures across the cell to be measured.

Water was flowed through the steel cell containing the glass spheres. The differential pressure was increased and an associated flow rate was obtained for each differential pressure. The "production direction" was defined to be the direction of the water flow. The measured flow rates and associated differential pressures are provided below in Table 3.

TABLE 3

Flow rate as a function of differential pressure.

| DIFFERENTIAL PRESSURE (BAR) | FLOW RATE (ML/MIN) | | |
|---|---|---|---|
| | Initial | After 16 hours | After 17 hours |
| 0.1 bar | 10 | 14 | 12 |
| 0.2 bar | 24 | 28 | 26 |
| 0.3 bar | 37 | 43 | 43 |
| 0.4 bar | 52 | 59 | 60 |
| 0.5 bar | 61 | 74 | 74 |
| 0.6 bar | 81 | 89 | 88 |

Next, 19 ml of CLAIRSOL 370 oil was injected into the cell in a direction opposite the production direction to determine the effect of introducing oil into the steel cell. The injection was allowed to proceed under gravitational flow and 19 ml of the oil flowed into the cell in 80 minutes. Accordingly, approximately 30% of the water in the steel cell was displaced by the oil. Furthermore, 4 ml of oil came through the steel cell, which indicates that the oil had channeled in the cell. Next, water was flowed through the cell in the production direction, the differential pressure was increased, and an associated flow rate was obtained for each differential pressure. The results of this test are provided below in Table 4.

TABLE 4

Flow rate as a function of differential pressure after introducing oil.

| DIFFERENTIAL PRESSURE (BAR) | FLOW RATE (ML/MIN) |
|---|---|
| 0.1 bar | 10 |
| 0.2 bar | 21 |
| 0.3 bar | 32 |
| 0.4 bar | 44 |
| 0.5 bar | 55 |
| 0.6 bar | 66 |

Accordingly, injection of the CLAIRSOL 370 oil, by itself, reduces the flow rate through the steel cell by about 20%. For example, the flow rate measurements for a differential pressure of 0.6 bar after introduction of the oil were about 20% lower than the measured initial flow rate.

Example 3

Example 3 investigates at least some of the effects of aluminum alcoholates on the water flow rate through a test cell containing Ballotini glass balls. An oil fluid of a mixture of aluminum-bis-(2-butoxide)-ethylacetoacetate and aluminum-(2-butoxide)-bis-(ethylacetoacetate), with an aluminum content of 6.2% was chosen for study. The test aluminum alcoholate solution was a 10% solution of the aluminum alcoholate oil solution in a CLAIRSOL 370 oil solution resulting in a final aluminum concentration of about 0.62%.

The same apparatus and experimental steps of Example 1 were used in this example. The water flow rate before the test was adjusted to be about 68 ml/min at 0.6 bar. The "production direction" was defined to be the direction of water flow. Then 15 ml of the test organoaluminum solution (final aluminum concentration of about 0.6%) was injected into the cell in a direction opposite to the production direction, followed by an injection of 15 ml of CLAIRSOL 370 in the production direction. Following the aging step (baking at 60° C. for 56 hours), water was again flowed in the production direction.

Water was flowed at a constant differential pressure through the test cell for five minutes and the flow rate was measured. The differential pressure increased according to the first column of Table 5, and a flow rate was obtained for each differential pressure measurement. Table 5 summarizes the results of this example.

TABLE 5

Flow rate after treatment with aluminum alcoholate.

| DIFFERENTIAL PRESSURE (bar) | FLOW RATE (ml/min) |
|---|---|
| 0.1 | 3.8 |
| 0.2 | 8.2 |
| 0.3 | 16 |
| 0.4 | 26 |
| 0.5 | 34 |
| 0.6 | 38 |

The results of Table 5 illustrate that the water flow rate following injection of aluminum alcoholate was reduced by about 45%. However, as illustrated by Example 2, injection of CLAIRSOL 370 alone may have reduce the flow rate of water by about 20%. The results shown in Table 5 illustrate that aluminum alcoholates may reduce the flow rate of water through the Ballotini bed. Additionally, the loose Ballotini balls had consolidated following the treatment with aluminum alcoholate. The portion of the bed that had been invaded by the solution was no longer loose, but formed a large clump of consolidated Ballotini which firmly filled the volume section of the steel cell. Significant effort was required to extract the Ballotini spheres from the cell. Specifically, the unconfined crushing strength of the treated Ballotini had increased from 0 psi to more than 50 psi.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of reducing the flow of water from a portion of a subterranean formation comprising:

drilling a borehole into the subterranean formation; and
while drilling a borehole into the subterranean formation, contacting the portion of the subterranean formation with an organoaluminum compound capable of forming at least one reaction product comprising aluminum hydroxide in the presence of water, the organoaluminum compound being present in an amount sufficient to form an amount of the reaction product sufficient to at least partially reduce the flow of water from the subterranean formation, wherein the organoaluminum compound comprises at least one organoaluminum compound selected from the group consisting of: an aluminum alkoxide, an aluminum butoxide, an aluminum tri-isopropoxide, an aluminum sec-butoxide di-isopropoxide, an aluminum tri-isoproxide octanol, an aluminum ethylacetoacetate di-isopropoxide, an aluminum ethylacetoacetate di-octoxide, and any combination thereof.

2. The method of claim 1 further comprising allowing the organoaluminum compound to react with water present in the subterranean formation so as to form the at least one reaction product.

3. The method of claim 2 wherein the at least one reaction product reduces the flow of water from the subterranean formation.

4. The method of claim 1 wherein the organoaluminum compound further comprises a stearate.

5. The method of claim 4 wherein the stearate comprises an aluminum oxystearate.

6. The method of claim 1 wherein the organoaluminum compound is a component of a drilling fluid, wherein the drilling fluid comprises an oil-based fluid and the organoaluminum compound.

7. The method of claim 6 wherein the oil-based fluid comprises a refined hydrocarbon.

8. The method of claim 6 wherein the drilling fluid comprises a sufficient amount of the organoaluminum compound to have an aluminum concentration in the range of from about 0.005% to about 10% weight of aluminum by volume of the drilling fluid.

9. The method of claim 6 wherein the drilling fluid comprises a sufficient amount of the organoaluminum compound to have an aluminum concentration in the range of from about 0.05% to about 5% weight of aluminum by volume of the drilling fluid.

10. The method of claim 6 wherein the drilling fluid comprises a sufficient amount of the organoaluminum compound to have an aluminum concentration in the range of from about 0.1% to about 1% weight of aluminum by volume of the drilling fluid.

11. The method of claim 6 wherein the drilling fluid comprises a sufficient amount of the organoaluminum compound to have an aluminum concentration of about 0.5% weight of aluminum by volume of the drilling fluid.

12. The method of claim 1 wherein the at least one reaction product comprises at least one reaction product selected from the group consisting of: a complex, a precipitate, and any combination thereof.

13. The method of claim 1 wherein the organoaluminum compound comprises at least one aluminum butoxide selected from the group consisting of: aluminum-bis-(2 butoxide)-ethylacetoacetate, aluminum-(2 butoxide)-bis-(ethylacetoacetate), and any combination thereof.

14. The method of claim 6 wherein the oil-based fluid comprises at least one oil-based fluid selected from the group consisting of: a mineral oil, a synthetic oil, an ester, and any combination thereof.

15. A method of reducing the flow of water from a portion of a subterranean formation, comprising:
 drilling a borehole into the subterranean formation; and
 while drilling a borehole into the subterranean formation, allowing an organoaluminum compound to react with water present in the portion of the subterranean formation to form at least one reaction product comprising aluminum hydroxide in an amount sufficient to at least partially block pore spaces in the portion of the subterranean formation, wherein the organoaluminum compound comprises at least one organoaluminum compound selected from the group consisting of: an aluminum alkoxide, an aluminum butoxide, an aluminum tri-isopropoxide, an aluminum sec-butoxide di-isopropoxide, an aluminum tri-isoproxide octanol, an aluminum ethylacetoacetate di-isopropoxide, an aluminum ethylacetoacetate di-octoxide, and any combination thereof.

16. The method of claim 15 further comprising contacting the portion of the subterranean formation with the organoaluminum compound.

17. The method of claim 15 wherein the organoaluminum compound is a component of a drilling fluid.

* * * * *